3,382,298
STRESS-CRACK RESISTANT POLYETHYLENE
CONTAINING A POLYVINYL ACETAL
Hans R. Larsen and Robert S. Zalkowitz, Montreal, Quebec, Canada, assignors to Union Carbide Canada Limited, Toronto, Ontario, Canada, a corporation of Canada
No Drawing. Filed Dec. 17, 1964, Ser. No. 419,239
3 Claims. (Cl. 260—897)

ABSTRACT OF THE DISCLOSURE

The environmental stress crack resistance of polyethylene is improved by blending the polyethylene with a polyvinyl ester or a polyvinyl acetal. Low density polyethylene mixed with polyvinyl ester or polyvinyl acetal results in a composition which has good environmental stress crack resistance and yet is easily extrudable on cable sheath.

---

This invention relates to polyethylene compositions having improved physical properties. More particularly, this invention relates to polyethylene compositions having improved environmental stress crack resistance prepared by incorporating into polyethylene a polyvinyl ester or a polyvinyl acetal.

Polyethylene has been extensively used in wire and cable insulation, containers, pipes, and in other similar uses where the polymer is subject to a large measure of externally applied stress. However, unless the polyethylene employed is of high molecular weight, i.e. having a melt index below about 0.1 decigram/minute it is characterized by rather poor environmental stress crack resistance, and readily cracks when subjected to externally applied stress. While the high molecular weight polymers are characterized by rather good environmental stress crack resistance, such polymers are difficult to process because of their undesirable rheological properties. This is particularly true in the extrusion of cable sheaths.

Thus there exists a strong-felt need for a polyethylene resin which is easily processable, and which at the same time possesses the excellent environmental stress crack resistance which is characteristic of only the high molecular weight polymers.

In accordance with the instant invention it has now been discovered that polyethylene compositions having both good processability and exceptional resistance to environmental stress cracking can be prepared by blending polyethylene with a polyvinyl ester or a polyvinyl acetal. The compositions produced by such procedure are characterized by letter processability and/or higher resistance to cracking than the polyethylenes from which they are produced, while the other physical properties of the polyethylenes, such as, for example, stiffness, tensile strength, elongation and dielectric strength, heat and light stability, etc., do not appear to undergo any significant deterioration.

The compositions of the instant invention are produced by blending the polyvinyl ester or polyvinyl acetal with polyethylene at temperatures above the softening point of the polymers. Blending can be easily effected at temperatures of from about 115° C to about 170° C., preferably from about 120° C. to about 150° C., by any conventional means, such as by means of a two-roll mill or a Banbury mixer, and is continued until a homogeneous solution of the two polymers is obtained. Upon cooling a solid solution is obtained.

The polyethylene employed in the instant invention can be either of the linear or branched-chain variety. However, regardless of the type of polyethylene employed, the polymer preferably has a melt index of from about 0.01 decigram/minute to about 30 decigrams/minute, and a density of from about 0.910 gram/cc. to about 0.965 gram/cc.

The polyvinyl esters employed in the instant invention are produced from vinyl ester monomers, such as those represented by the formula

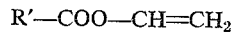

$$R'—COO—CH=CH_2$$

wherein R' is an alkyl radical having from 1 to about 20 carbon atoms, preferably from 1 to 4 carbon atoms. Illustrative of R' in the above formula are radicals such as methyl, ethyl, n-propyl, isopropyl, n-butyl, isobutyl, n-pentyl, n-hexyl, cyclohexyl, 4-methylpentyl, n-heptyl, n-octyl, 2-ethylhexyl, n-nonyl, n-decyl, 2,2-dimethyldecyl, n-tridecyl, n-tetradecyl, n-pentadecyl, n-octadecyl, n-eicosyl, and the like.

The polyvinyl esters employed in the instant invention are well known and can be prepared by polymerizing a vinyl ester, such as described above, by means of a free radical polymerization catalyst, such as oxygen or an organic peroxide, at a temperature of from about 60° C. to about 90° C. By varying the pressure, temperature, and catalyst concentration, polymers of widely varying molecular weights can be obtained. The preferred polymers are those characterized by a molecular weight of from about 7,000 to about 140,000, most preferably from about 15,000 to about 90,000, depending upon the particular polymer; however, suitable compositions can be formed from polymers having both higher and lower molecular weights.

Alternatively to the use of a polyvinyl ester, a polyvinyl acetal can be employed in the compositions of the instant invention. Such polymers are well known and can be prepared by hydrolyzing a polyvinyl ester, such as described above, e.g. polyvinyl acetate, and reacting the partially or completely hydrolyzed polyvinyl ester with an aldehyde, particularly one represented by the formula

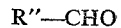

$$R''—CHO$$

wherein R'' is a member selected from the group consisting of hydrogen and alkyl radicals having from 1 to about 20 carbon atoms, preferably from 1 to 4 carbon atoms. Illustrative of R'' in the above formula are radicals such as methyl, ethyl, n-propyl, isopropyl, n-butyl, isobutyl, n-pentyl, n-hexyl, cyclohexyl, 4-methylpentyl, n-heptyl, n-octyl, 2-ethylhexyl, n-nonyl, n-decyl, 2,2-dimethyldecyl, n-tridecyl, n-tetradecyl, n-pentadecyl, n-octadecyl, n-eicosyl, and the like.

The polyvinyl acetals prepared in the manner described above may contain a certain number of ester groups, originally present in the polyvinyl ester, which have not been hydrolyzed, as well as a certain number of hydroxyl groups, produced by the hydrolysis, which have not reacted with the aldehyde employed. Thus, such acetals may contain from 1 mol percent to 7 mol percent of ester groups calculated as polyvinyl ester, and from 19 mol percent to 50 mol percent of hydroxyl groups calculated as polyvinyl alcohol, with the balance of the acetal, i.e. from 43 mol percent to 80 mol percent, being polyvinyl acetal calculated as such. The preferred acetals are those characterized by a molecular weight of from about 7,000 to about 100,000, most preferably from about 15,000 to about 55,000, depending upon the particular acetal; however, suitable compositions can be formed from acetals having both higher and lower molecular weights. When the acetal employed is polyvinyl formal, it preferably has a molecular weight of from about 7,000 to about 100,000, most preferably from about 16,000 to about 50,000, while when the acetal is polyvinyl butyral, it preferably has a molecular weight of from about 15,000 to about 90,000, most preferably from about 45,000 to about 55,000.

The step by step preparation of a polyvinyl acetal by the polymerization of a vinyl ester to a polyvinyl ester followed by the hydrolysis of the polyvinyl ester to a polyvinyl alcohol and reaction of the polyvinyl alcohol with an aldehyde can be represented by the following:

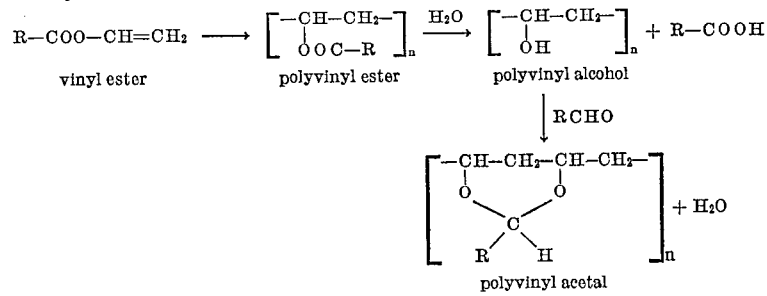

wherein R is an alkyl radical and $n$ is an integer. As stated above, the polyvinyl acetals prepared in this manner may contain from 1.0 mol percent to 7.0 mol percent of polyvinyl ester units and from 19.0 mol percent to 50.0 mol percent of polyvinyl alcohol units.

The polyethylene and polyvinyl ester or polyvinyl acetal can be blended together in amounts varying over rather wide ranges, with the minimum amount of modifier employed depending upon the degree of improvement of environmental stress crack resistance desired, and the maximum amount limited solely by the compatibility and ease of compounding of the modifier with the polyethylene. In general, for polyethylenes having a density of from about 0.910 gram/cc. to about 0.965 gram/cc. and a melt index up to about 50 decigrams/minute, amounts of polyvinyl ester of from about 1 percent by weight to about 30 percent by weight, based on the overall weight of the mixture, give satisfactory results, while amounts of polyvinyl acetal of from about 1 percent by weight to about 8 percent by weight, again based on the overall weight of the mixture, also give satisfactory results. Commercial considerations, however, might serve to limit the concentration of modifier to a maximum of about 15 percent.

When employing low density polyethylene, i.e. polyethylene haivng a density of from about 0.910 gram/cc. to about 0.925 gram/cc., an amount of polyvinyl ester of from about 1 percent by weight to about 13 percent by weight, preferably from about 2 percent by weight to about 10 percent by weight, based on the overall weight of the mixture is most suitable for polyethylene having a melt index up to about 50 decigrams/minute, while an amount of polyvinyl acetal of from about 1 percent by weight to about 8 percent by weight, preferably from about 2 percent by weight to about 5 percent by weight, again based on the overall weight of the mixture, is most suitable for polyethylene of the like density and melt index. When the polyvinyl ester employed is polyvinyl acetate, it is most effectively employed in an amount of from about 1 percent by weight to about 13 percent by weight, preferably from about 2 percent by weight to about 10 percent by weight, based on the overall weight of the mixture, with polyethylene having a melt index of from about 0.01 decigram/minute to about 50 decigrams/minute, preferably from about 0.01 decigram/minute to about 35 decigrams/minute. Polyvinyl formal and polyvinyl butyral are both most effectively employed in an amount of from about 1 percent by weight to about 8 percent by weight, preferably from about 2 percent by weight to about 5 percent by weight, based on the overall weight of the mixture, with polyethylene having a melt index of from about 0.01 decigram/minute to about 50 decigrams/minute, preferably from about 0.02 decigram/minute to about 15 decigrams/minute.

When an intermediate density polyethylene is employed, i.e. a polyethylene having a density of from about 0.926 gram/cc. to about 0.940 gram/cc., an amount of polyvinyl ester of from about 1 percent by weight to about 30 percent by weight, preferably from about 2 percent by weight to about 20 percent by weight, based on the overall weight of the mixture, is most suitable for polyethylene having a melt index up to about 50 decigrams/minute, while an amount of polyvinyl acetal of from about 1 percent by weight to about 8 percent by weight, preferably from about 2 percent by weight to about 5 percent by weight, again based on the overall weight of the mixture, is most suitable for polyethylene of like density and melt index. When the polyvinyl ester employed is polyvinyl acetate, it is most effectively employed in an amount of from about 1 percent by weight to about 13 percent by weight, preferably from about 2 percent by weight to about 10 percent by weight, based on the overall weight of the mixture, with polyethylene having a melt index of from about 0.05 decigram/minute to about 4 decigrams/minute. For polyethylene having a melt index of from about 4 decigrams/minute to about 30 decigrams/minute, and preferably from about 4 decigrams/minute to about 15 decigrams/minute, an amount of polyvinyl acetate of from about 1 percent by weight to about 30 percent by weight, preferably from about 2 percent by weight to about 20 percent by weight, based on the overall weight of the mixture, is most effectively employed. Polyvinyl formal and polyvinyl butyral are both most effectively employed in an amount of from about 1 percent by weight to about 8 percent by weight, preferably from about 2 percent by weight to about 5 percent by weight, based on the overall weight of the mixture, with polyethylene having a melt index of from about 0.05 decigram/minute to about 30 decigrams/minute, preferably from about 0.1 decigram/minute to about 15 decigrams/minute.

For high density polyethylene, i.e. polyethylene having a density of from about 0.941 gram/cc. to about 0.965 gram/cc., an amount of polyvinyl ester of from about 1 percent by weight to about 17 percent by weight, preferably from about 2 percent by weight to about 15 percent by weight, based on the overall weight of the mixture, is most suitable for polyethylene having a melt index up to about 50 decigrams/minute, while an amount of polyvinyl acetal of from about 1 percent by weight to about 8 percent by weight, preferably from about 2 percent by weight to about 5 percent by weight, again based on the overall weight of the mixture, is most suitable for polyethylene of like density and melt index. When the polyvinyl ester employed is polyvinyl acetate, it is most effectively employed in an amount of from about 1 percent by weight to about 17 percent by weight, preferably from about 2 percent by weight to about 15 percent by weight, based on the overall weight of the mixture, with polyethylene having a melt index of from about 0.05 decigram/minute to about 20 decigrams/minute, preferably from about 0.2 decigram/minute to about 10 decigrams/minute. Polyvinyl formal and polyvinyl butyral are both most effectively employed in an amount of from about 1 percent by weight to about 8 percent by weight, preferably from about 2 percent by weight to about 5 percent by weight, based on the overall weight of the mixture, with polyethylene having a melt index of from about 0.05 decigram/minute to about 20 decigrams/minute, preferably from about 0.1 decigram/minute to about 15 decigrams/minute.

Blends of low, intermediate, and high density polyethylene, or any of these, can also be intermixed with a polyvinyl ester or a polyvinyl acetal modifier, with the amount of modifier employed depending upon the amount of each polyethylene present and the combined melt index and density of the polyethylene blend.

In addition, fillers, oxidation inhibitors, coloring agents, etc., such as carbon black, silica, and the like, conventionally used and well known in the art, can also be present in the blends of this invention. Such additives are usually not employed in excess of about 10 percent by weight, based on the overall weight of the mixture.

The following examples are set forth for purposes of illustration so that those skilled in the art may better understand this invention, and it should be understood that they are not to be construed as limiting this invention in any manner. The polyethylene and polyethylene compositions of said examples were evaluated in accordance with the following testing techniques:

Melt index.—The rate at which a polymer is extruded at 190° C. through a die having a diameter of 0.0825 inch and a land length of 0.315 inch in accordance with the procedure in ASTM test procedure D-1238-57T, condition E. This property is expressed in decigrams per minute.

Density.—Determined in accordance with the density gradient technique described in ASTM test procedure D-1505-60T, Method A, using isopropanol and an aqueous sodium acetate solution as the liquid density gradient at a temperature of 23° C. The test specimens were cut from compression molded plaques and conditioned for the density determination according to the procedures outlined in ASTM test procedure D-1248-59T, paragraph 6(c).

Crack resistance.—Determined in accordance with proposed ASTM test procedure D-1693-59T on 1.5" x 0.5" x 0.125" multiaxially stressed polymer specimens cut from compression molded plaques of the polymer. The plaques were conditioned for the test in the manner described in the examples rather than by boiling in water. Each specimen was slit and bent as described in the test procedure, and immersed in this stressed condition in a test tube containing a surface-active agent, such as Igepal CO-630 (an alkyl phenoxy polyoxyethlene ethanol). The surface-active agent was maintained at a temperature of 50° C. The time in hours required to produce the first visible evidence of cracking perpendicular to the slit is the crack resistance value, $F_0$. The time in hours required to crack fifty percent of the samples tested is the crack resistance value, $F_{50}$.

EXAMPLE 1

A polyvinyl acetate having a molecular weight of about 15,000 (sold commercially as "Gelva 7" by the Shawinigan Resins and Chemicals Co.) was blended in varying proportions with a low density polyethylene resin (d.= 0.922 g./cc., M.I.=0.031 dg./min.) to produce compositions having polyvinyl acetate concentrations of 2 percent by weight and 10 percent by weight, respectively. Blending was effected in each instance by milling the polyvinyl acetate and polyethylene in the molten state on a two-roll mill at a temperature of 135° C. to produce a homogeneous melt which cooled to form a homogeneous solid solution.

Each composition produced, as well as the unmodified polyethylene base resin employed in producing the compositions, was compression molded at a temperature of 180° C. to produce 0.125 inch thick plaques for use in testing crack resistance.

The plaques were conditioned for testing by heating while still in the mold at a temperature of 140° C. for one hour and cooling the resulting melt to 50° C. at the rate of 5° C./hour. The crack resistance test was conducted on 1.5" x 0.5" x 0.125" specimens in a 20 percent by volume solution of Igepal CO-630 in water in the manner described above. The plaque containing 2 percent by weight polyvinyl acetate had an $F_{50}$ value of about 100 hours while the plaque containing 10 percent by weight polyvinyl acetate had an $F_0$ value of greater than 300 hours. The plaque prepared from the unmodified polyethylene base resin had an $F_{50}$ value of only 8 hours.

EXAMPLE 2

A polyvinyl acetate having a molecular weight of about 50,000 (sold commercially as "Gelva 15" by the Shawinigan Resins and Chemicals Co.) was blended as in Example 1 in varying proportions with the polyethylene resin employed in Example 1 to produce compositions having polyvinyl acetate concentrations of 2 percent by weight and 5 percent by weight, respectively. The compositions produced were compression molded at 180° C. as in Example 1, and the resulting plaques were conditioned and tested for crack resistance as in Example 1.

The plaque containing 2 percent by weight polyvinyl acetate had an $F_{50}$ value of greater than 300 hours, as did the plaque containing 5 percent by weight polyvinyl acetate.

EXAMPLE 3

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 1 to produce compositions having polyvinyl acetate concentrations of 2 percent by weight and 10 percent by weight, respectively. The compositions produced were compression molded at 180° C. as in Example 1, and the resulting plaques were conditioned and tested for crack resistance as in Example 1.

The plaque containing 2 percent by weight polyvinyl acetate had an $F_{50}$ value of greater than 300 hours, and the plaque containing 10 percent by weight polyvinyl acetate had an $F_0$ value of greater than 300 hours.

EXAMPLE 4

A polyvinyl butyral having a molecular weight of about 45,000–55,000, a polyvinyl alcohol content of about 11 percent by weight, and a maximum polyvinyl acetate content of 2.5 percent by weight (sold commercialy as "Butvar B-76" by the Shawinigan Resins and Chemicals Co.) was blended as in Example 1 with the polyethylene resin employed in Example 1 to produce a composition having a polyvinyl butyral concentration of 2 percent by weight. The composition produced was compression molded at 180° C. as in Example 1, and the resulting plaque was conditioned and tested for crack resistance as in Example 1.

The plaque had an $F_{50}$ value of 48 hours.

EXAMPLE 5

A polyvinyl formal having a molecular weight of about 16,000–20,000, a polyvinyl alcohol content of about 8 percent by weight, and a maximum polyvinyl acetate content of 13 percent by weight (sold commercially as "Formvar 7/95S" by the Shawinigan Resins and Chemicals Co.) was blended as in Example 1 with the polyethylene resin employed in Example 1 to produce a composition having a polyvinyl formal concentration of 2 percent by weight. The composition produced was compression molded at 180° C. as in Example 1, and the resulting plaque was conditioned and tested for crack resistance as in Example 1.

The plaque had an $F_0$ value of greater than 300 hours.

EXAMPLE 6

A polyvinyl formal having a molecular weight of about 50,000, a polyvinyl alcohol content of about 8 percent by weight, and a maximum polyvinyl acetate content of 13 percent by weight (sold commercially as "Formvar 15/

95SS" by the Shawinigan Resins and Chemicals Co.) was blended as in Example 1 in varying proportions with a low density polyethylene resin (d.=0.920 g./cc., M.I.=0.13 dg./min.) to produce compositions having polyvinyl formal concentrations of 2 percent by weight and 5 percent by weight, respectively. The compositions produced, as well as the unmodified polyethylene base resin employed in producing the compositions, were compression molded at 180° C. as in Example 1, and the resulting plaques were conditioned and tested for crack resistance as in Example 1.

The plaque containing 2 percent by weight polyvinyl formal had an $F_{50}$ value of 4 hours while the plaque containing 5 percent by weight polyvinyl formal had an $F_{50}$ value of 6 hours. The plaque prepared from the unmodified polyethylene base resin had an $F_{50}$ value of only 1 hour.

EXAMPLE 7

A polyvinyl acetate having a molecular weight of about 50,000 (sold commercially as "Gelva 15" by the Shawinigan Resins and Chemicals Co.) was blended as in Example 1 in varying proportions with a low density polyethylene resin (d.=0.919 g./cc., M.I.=0.44 dg./min.) to produce compositions having polyvinyl acetate concentration of 5 percent by weight and 30 percent by weight, respectively. The compositions produced, as well as the unmodified polyethylene base resin employed in producing the compositions, were compression molded at 180° C. as in Example 1, and the resulting plaques were conditioned and tested for crack resistance as in Example 1.

The plaque containing 5 percent by weight polyvinyl acetate had an $F_0$ value of greater than 300 hours, as did the plaque containing 30 percent by weight polyvinyl acetate. The plaque prepared from the unmodified polyethylene base resin had an $F_{50}$ value of only 3 hours.

EXAMPLE 8

A polyvinyl acetate having a molecular weight of about 15,000 (sold commercially as "Gelva 7" by the Shawinigan Resins and Chemicals Co.) was blended as in Example 1 in varying proportions with a low density polyethylene resin (d.=0.917 g./cc., M.I.=4.85 dg./min.) to produce compositions having polyvinyl acetate concentrations of 2 percent by weight and 10 percent by weight, respectively. The compositions produced, as well as the unmodified polyethylene base resin employed in producing the compositions, were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.8 hour while the plaque containing 10 percent by weight polyvinyl acetate had an $F_{50}$ value of 2 hours. The plaque prepared from the unmodified polyethylene base resin had an $F_{50}$ value of only 0.7 hour.

EXAMPLE 9

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 8 to produce compositions having polyvinyl acetate concentrations of 2 percent by weight and 10 percent by weight, respectively. The compositions produced were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.8 hour while the plaque containing 10 percent by weight polyvinyl acetate had an $F_{50}$ value of 2.5 hours.

EXAMPLE 10

A polyvinyl acetate having a molecular weight of about 15,000 (sold commercially as "Gelva 7" by the Shawinigan Resins and Chemicals Co.) was blended as in Example 1 in varying proportions with a low density polyethylene resin (d.=0.924 g./cc., M.I.=30.7 dg./min.) to produce compositions having polyvinyl acetate concentrations of 2 percent by weight and 10 percent by weight, respectively. The compositions produced, as well as the unmodified polyethylene base resin employed in producing the compositions, were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.05 hour while the plaque containing 10 percent by weight polyvinyl acetate had an $F_{50}$ value of 0.09 hour. The plaque prepared from the unmodified polyethylene base resin had an $F_{50}$ value of only 0.03 hour.

EXAMPLE 11

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 10 to produce compositions having polyvinyl acetate concentrations of 2 percent by weight and 10 percent by weight, respectively. The compositions produced were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.05 hour while the plaque containing 10 percent by weight polyvinyl acetate had an $F_{50}$ value of 0.08 hour.

EXAMPLE 12

A polyvinyl acetate having a molecular weight of about 15,000 (sold commercially as "Gelva 7" by the Shawinigan Resins and Chemicals Co.) was blended as in Example 1 in varying proportions with a polyethylene resin blend of a high and a low density resin (combined d.=0.933 g./cc., combined M.I.=0.16 dg./min.) to produce compositions having polyvinyl acetate concentrations of 2 percent by weight and 10 percent by weight, respectively. The compositions produced, as well as the unmodified polyethylene base resin blend employed in producing the compositions, were compression molded at 180° C. as in Example 1 to produce 0.125 inch thick plaques. The plaques were conditioned for use in testing crack resistance by heating while still in the mold at a temperature of 145° C. for one hour and cooling the resulting melt to 50° C. at the rate of 5° C./hour, and then tested for crack resistance as in Example 1.

The plaque containing 2 percent by weight polyvinyl acetate had an $F_{50}$ value of 96 hours while the plaque containing 10 percent by weight polyvinyl acetate had an $F_0$ value of greater than 300 hours. The plaque prepared from the unmodified polyethylene base resin blend had an $F_{50}$ value of about 6 hours.

EXAMPLE 13

A polyvinyl acetate having a molecular weight of about 90,000 (sold commercially as "Gelva 25" by the Shawinigan Resins and Chemicals Co.) was blended as in Example 1 in varying proportions with the polyethylene resin blend employed in Example 12 to produce compositions having polyvinyl acetate concentrations of 2 percent by weight and 10 percent by weight, respectively. The compositions produced were compression molded at 180° C. as in Example 1, and the resulting plaques were conditioned and tested for crack resistance as in Example 12.

The plaque containing 2 percent by weight polyvinyl acetate had an $F_{50}$ value of 50 hours while the plaque containing 10 percent by weight polyvinyl acetate had an $F_{50}$ value of 144 hours.

EXAMPLE 14

A polyvinyl acetate having a molecular weight of about 15,000 (sold commercially as "Gelva 7" by the Shawinigan Resins and Chemicals Co.) was blended as in Example 1 in varying proportions with an intermediate density polyethylene resin (d.=0.935 g./cc., M.I.=2.6 dg./min.) to produce compositions having polyvinyl acetate concentrations of 2 percent by weight and 10 percent by weight, respectively. The compositions produced, as well as the unmodified polyethylene base resin employed in producing the compositions, were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 15 hours while the plaque containing 10 percent by weight polyvinyl acetate had an $F_{50}$ value of 200 hours. The plaque prepared from the unmodified polyethylene base resin had an $F_{50}$ value of only 2 hours.

EXAMPLE 15

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 14 to produce compositions having polyvinyl acetate concentrations of 2 percent by weight and 10 percent by weight, respectively. The compositions produced were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 14 hours while the plaque containing 10 percent by weight polyvinyl acetate had an $F_{50}$ value of 220 hours.

EXAMPLE 16

A polyvinyl acetate having a molecular weight of about 15,000 (sold commercially as "Gelva 7" by the Shawinigan Resins and Chemicals Co.) was blended as in Example 1 in varying proportions with an intermediate density polyethylene resin (d.=0.930 g./cc., M.I.=5.7 dg./min.) to produce compositions having polyvinyl acetate concentrations of 2 percent by weight, 10 percent by weight, and 20 percent by weight, respectively. The compositions produced, as well as the unmodified polyethylene base resin employed in producing the compositions, were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.3 hour while the plaque containing 10 percent by weight polyvinyl acetate had an $F_{50}$ value of 1.2 hours and the plaque containing 20 percent by weight polyvinyl acetate had an $F_{50}$ value of 0.7 hour. The plaque prepared from the unmodified polyethylene base resin had an $F_{50}$ value of only 0.05 hour.

EXAMPLE 17

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 16 to produce compositions having polyvinyl acetate concentrations of 2 percent by weight, 10 percent by weight, and 20 percent by weight, respectively. The compositions produced were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 0.2 hour while the plaque containing 10 percent by weight polyvinyl acetate had an $F_{50}$ value of 1.5 hours and the plaque containing 20 percent by weight polyvinyl acetate had an $F_{50}$ value of 0.5 hour.

EXAMPLE 18

A polyvinyl acetate having a molecular weight of about 15,000 (sold commercially as "Gelva 7" by the Shawinigan Resins and Chemicals Co.) was blended as in Example 1 in varying proportions with a high density polyethylene resin (d.=0.96 g./cc., M.I.=1.8 dg./min.) to produce compositions having polyvinyl acetate concentrations of 2 percent by weight and 10 percent by weight, respectively. The compositions produced, as well as the unmodified polyethylene base resin employed in producing the compositions, were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 5 hours while the plaque containing 10 percent by weight polyvinyl acetate had an $F_{50}$ value of 16 hours. The plaque prepared from the unmodified polyethylene base resin had an $F_{50}$ value of only 2 hours.

EXAMPLE 19

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 18 to produce compositions having polyvinyl acetate concentrations of 2 percent by weight, 10 percent by weight, and 15 percent by weight, respectively. The compositions produced were compression molded at 180° C. as in Example 1, and the molten plaques were quench cooled while still in the mold by immersion under cold running water. The cooled plaques were tested for crack resistance in Igepal CO-630.

The plaque containing 2 percent by weight polyvinyl acetate had an $F_{50}$ value of 4 hours while the plaque containing 10 percent by weight polyvinyl acetate had an $F_{50}$ value of 8 hours and the plaque containing 15 percent by weight polyvinyl acetate had an $F_{50}$ value of 10.5 hours.

EXAMPLE 20

A polyvinyl acetate having a molecular weight of about 15,000 (sold commercially as "Gelva 7" by the Shawinigan Resins and Chemicals Co.) was blended as in Example 1 with a high density polyethylene resin (d.=0.948 g./cc., M.I.=3.75 dg./min.) to produce a composition having a polyvinyl acetate concentration of 10 percent by weight. The composition produced, as well as the unmodified polyethylene base resin employed in producing the composition, was compression molded at 180° C. as in Example 1, and the molten plaques were quench cooled while still in the mold by immersion under cold running water. The cooled plaques were tested for crack resistance in Igepal CO-630.

The plaque containing 10 percent by weight polyvinyl acetate had an $F_{50}$ value of 16 hours. The plaque prepared from the unmodified polyethylene base resin had an $F_{50}$ value of only 3.2 hours.

EXAMPLE 21

A polyvinyl acetate having a molecular weight of about 90,000 (sold commercially as "Gelva 25" by the Shawinigan Resins and Chemicals Co.) was blended as in Example 1 in varying proportions with the polyethylene resin employed in Example 20 to produce compositions having polyvinyl acetate concentrations of 2 percent by weight and 10 percent by weight, respectively. The compositions produced were compression molded at 180° C. as in Example 1, and the molten plaques were quench cooled while still in the mold by immersion under cold running water. The cooled plaques were tested for crack resistance in Igepal CO–630.

The plaque containing 2 percent by weight polyvinyl acetate had an $F_{50}$ value of 12 hours, as did the plaque containing 10 percent by weight polyvinyl acetate.

What is claimed is:

1. A homogeneous, easily processable, crack-resistant composition consisting essentially of
   (a) from about 95 percent by weight to about 98 percent by weight of a polyethylene having a density of from about 0.910 gram/cc. to about 0.965 gram/cc. and a melt index up to about 50 decigrams/minute, and
   (b) from about 2 percent by weight to about 5 percent by weight of a polyvinyl acetal containing from 43 mol percent to 80 mol percent of polyvinyl acetal units represented by the formula

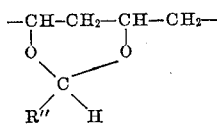

wherein R″ is a member selected from the group consisting of hydrogen and alkyl radicals having from 1 to 4 carbon atoms, from 19 mol percent to 50 mol percent of polyvinyl alcohol units represented by the formula

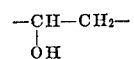

and from 1 mol percent to 7 mol percent of polyvinyl ester units represented by the formula

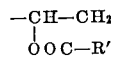

wherein R′ is an alkyl radical having from 1 to 4 carbon atoms, said polyvinyl acetal having a molecular weight of from about 15,000 to about 55,000.

2. A composition as claimed in claim 1 wherein the polyvinyl acetal is polyvinyl butyral containing from 19 mol percent to 50 mol percent of polyvinyl alcohol units and from 1 mol percent to 7 mol percent of polyvinyl acetate units, said polyvinyl butyral having a molecular weight of from about 15,000 to about 90,000.

3. A composition as claimed in claim 1 wherein the polyvinyl acetal is polyvinyl formal containing from 19 mol percent to 50 mol percent of polyvinyl alcohol units, and from 1 mol percent to 7 mol percent of polyvinyl acetate units, said polyvinyl formal having a molecular weight of from about 7,000 to about 100,000.

References Cited

UNITED STATES PATENTS

| | | | |
|---|---|---|---|
| 2,448,666 | 9/1948 | Fletcher | 260—897 |
| 3,090,769 | 5/1963 | Coover et al. | 260—897 |
| 3,114,728 | 12/1963 | Herbig et al. | 260—897 |
| 3,156,745 | 11/1964 | Behrenbruch et al. | 260—897 |
| 3,182,101 | 5/1965 | Rees | 260—897 |
| 3,222,455 | 12/1965 | Matsubayashi et al. | 260—897 |
| 3,248,359 | 4/1966 | Maloney | 260—897 |

GEORGE F. LESMES, *Primary Examiner.*

M. TILLMAN, *Examiner.*

T. G. FIELD, *Assistant Examiner.*